(No Model.) 4 Sheets—Sheet 1.
A. H. LEA & J. F. FOULKE.
FILTER.
No. 553,994. Patented Feb. 4, 1896.
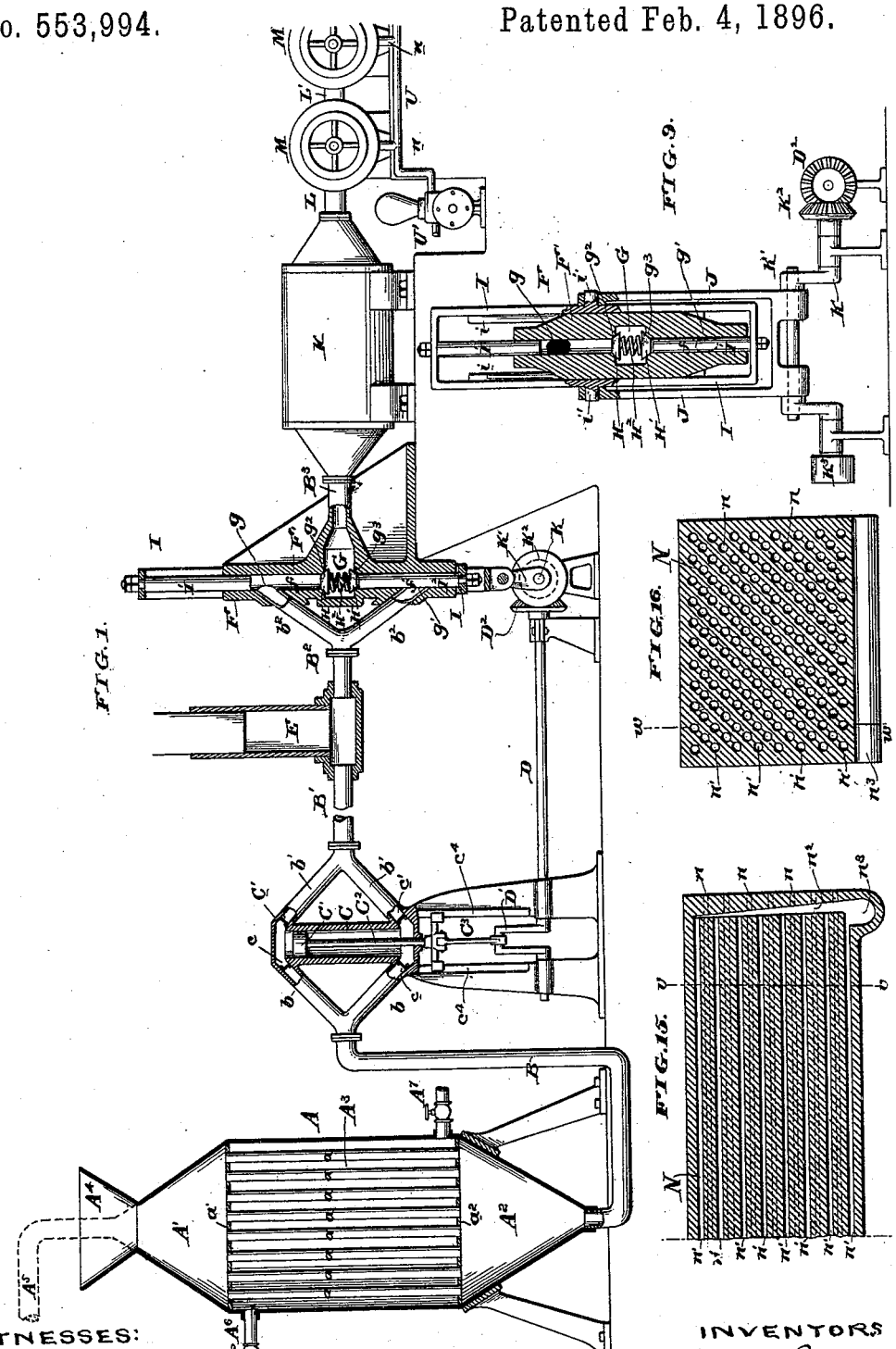
WITNESSES:
Henry Drury
David S. Williams
INVENTORS
Arthur H. Lea
John Francis Foulke
by their attorneys
Francis T. Chambers

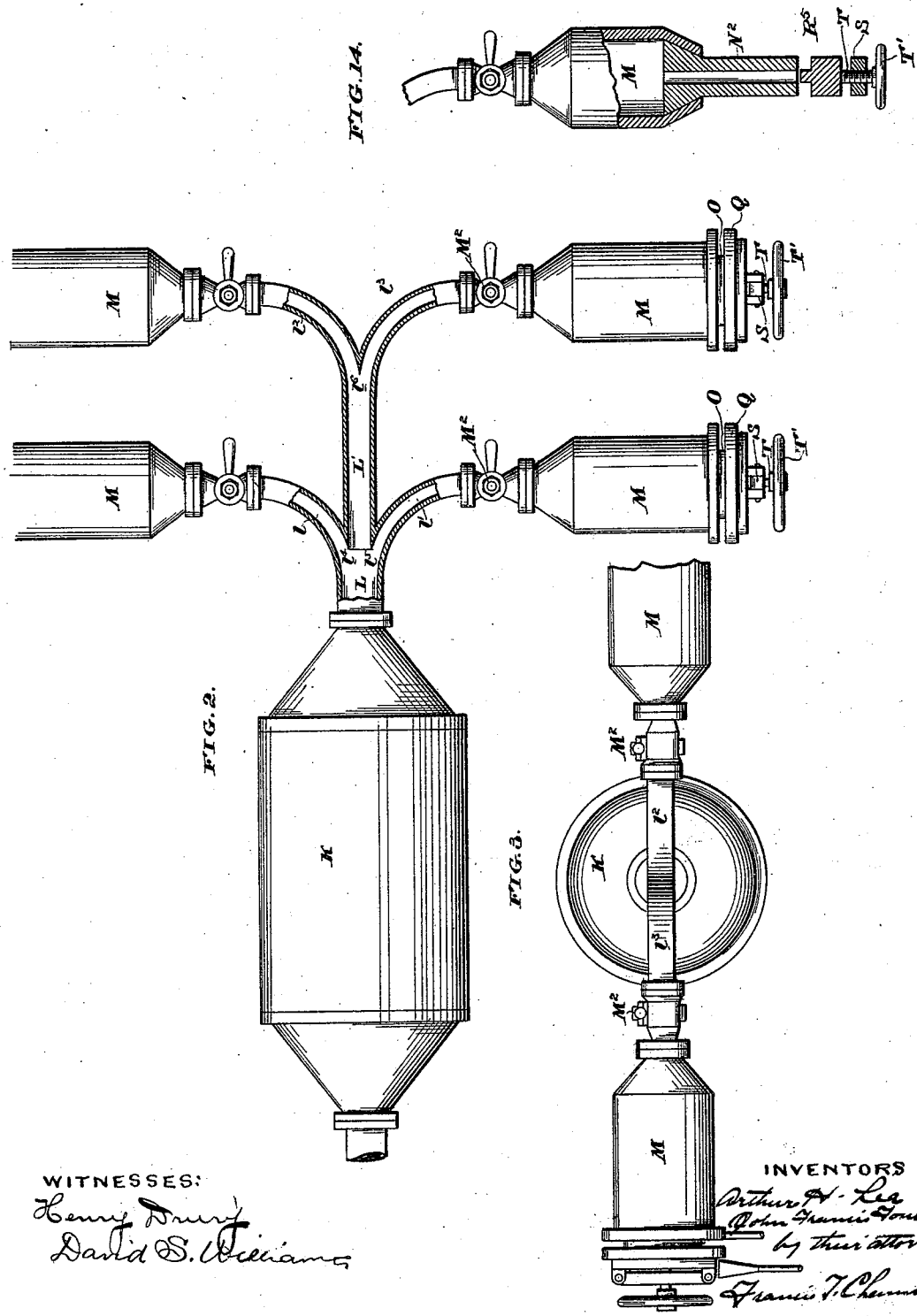

(No Model.) 4 Sheets—Sheet 3.
A. H. LEA & J. F. FOULKE.
FILTER.
No. 553,994. Patented Feb. 4, 1896.
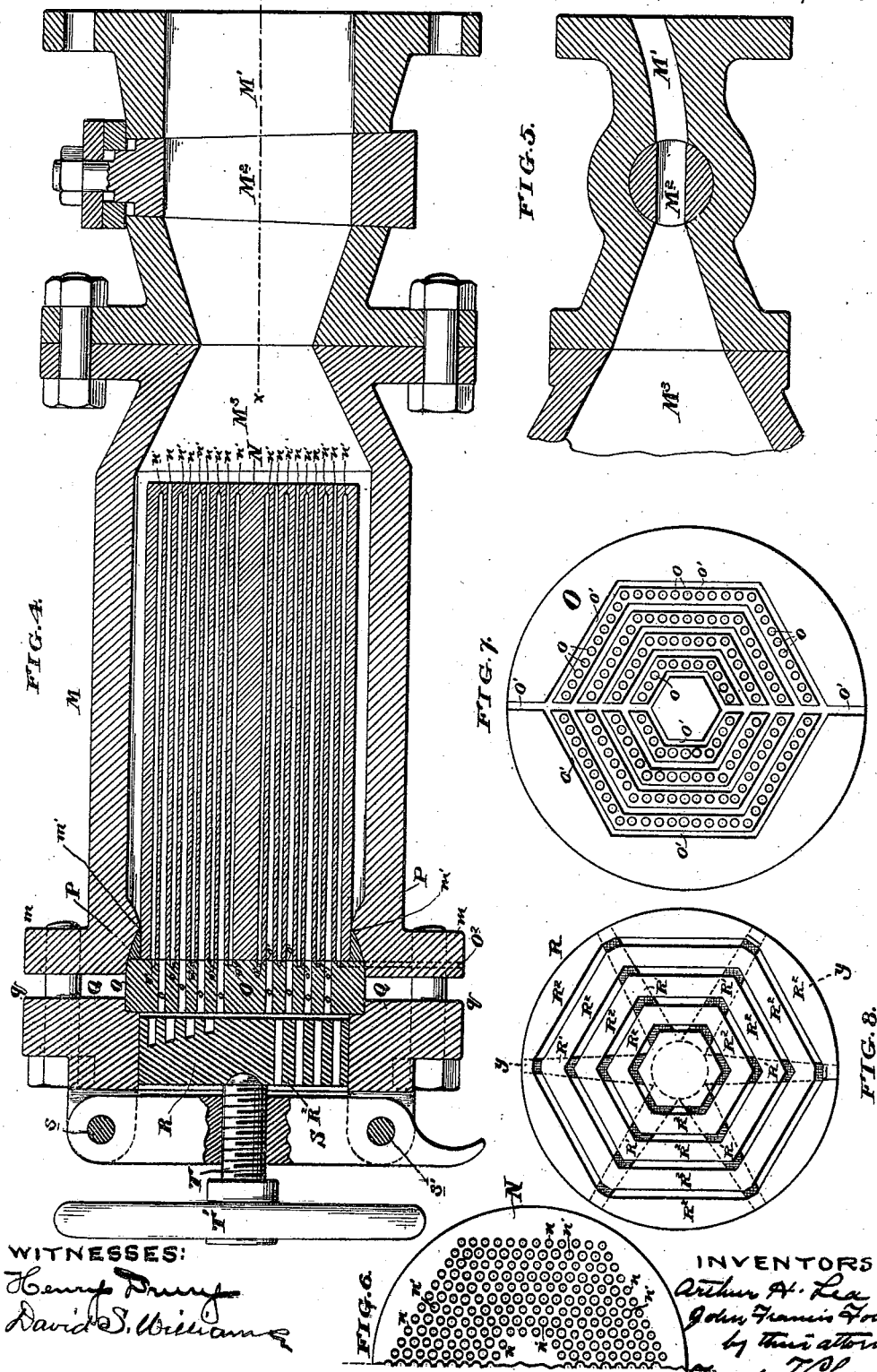
WITNESSES:
INVENTORS (No Model.) 4 Sheets—Sheet 4.
A. H. LEA & J. F. FOULKE.
FILTER.
No. 553,994. Patented Feb. 4, 1896.
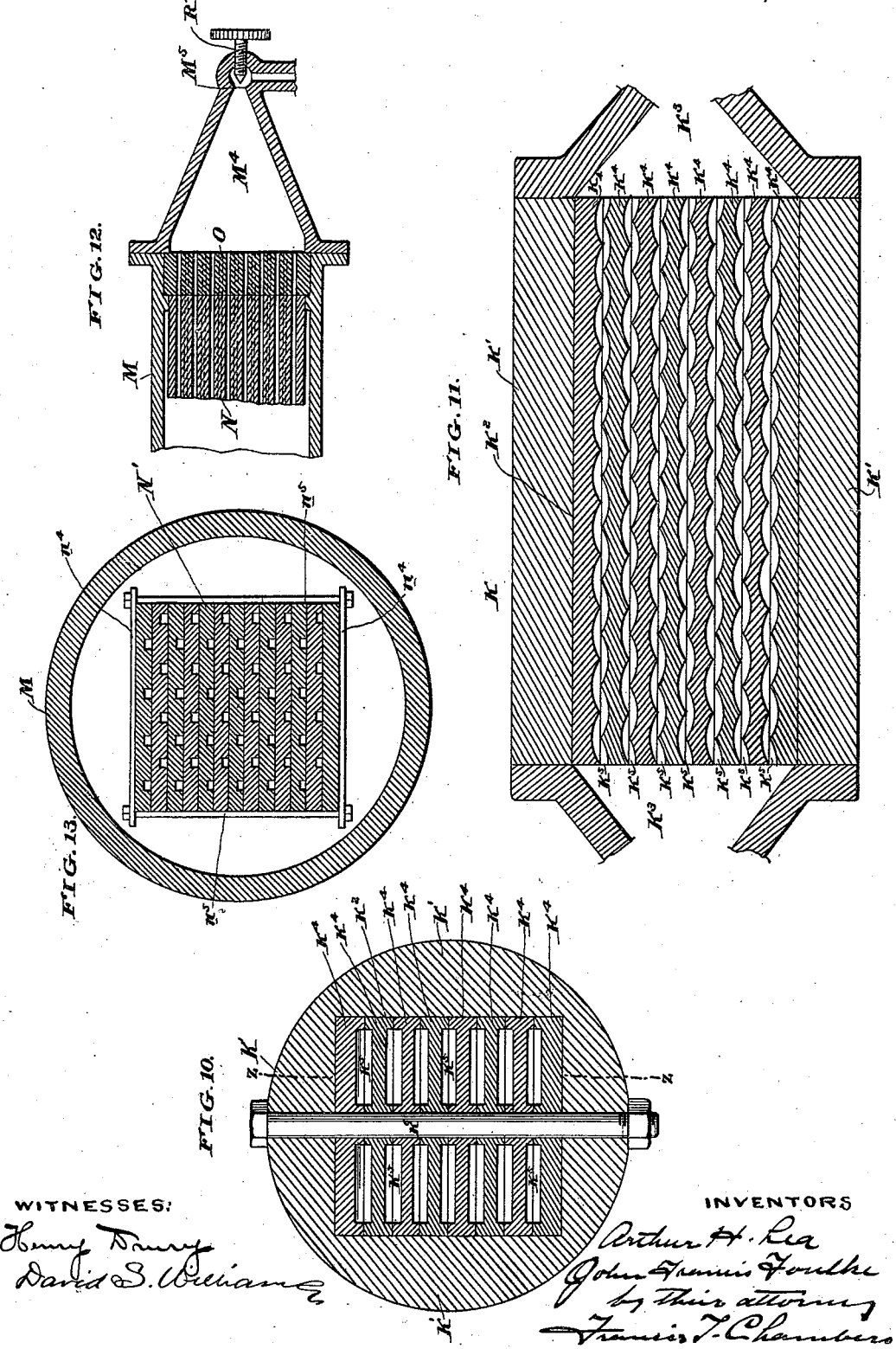
WITNESSES: INVENTORS

UNITED STATES PATENT OFFICE.

ARTHUR H. LEA AND JOHN FRANCIS FOULKE, OF PHILADELPHIA, PENNSYLVANIA.

FILTER.

SPECIFICATION forming part of Letters Patent No. 553,924, dated February 4, 1896.

Application filed July 9, 1889. Serial No. 316,924. (No model.)

*To all whom it may concern:*

Be it known that we, ARTHUR H. LEA and JOHN FRANCIS FOULKE, of the city and county of Philadelphia, State of Pennsylvania, have invented a new and useful Improved Filter, of which the following is a true and exact description, reference being had to the accompanying drawings, which form a part of this specification.

Our invention relates to the construction of devices for separating liquids from solid matter mixed with them and generally known as "filters."

The object of our invention is to provide an improved device of this kind, and especially we have in view the separation of oils from meal—for instance, the separation of cotton-seed oil from the ground mass of cotton-seed—though our device is also adapted for all sorts of filtering operations, such as the purification of water, &c.

The leading feature of our invention is our device consisting of a block of porous material (preferably earthenware of fine grain, including in the term "earthenware" porous conglomerated masses of powdered mineral) adapted to be secured in a filter-chamber and provided with perforations for the reception of the material to be filtered—that is, opening at the side of the porous block which forms a wall of the filter-chamber. The perforations may for some uses terminate in the body of the block. We only claim this construction, however, when the block is pierced with a number of perforations. Preferably we continue them through the mass and provide a valve to close or partly close them on the outer side of the porous block, and we claim this construction whether one or more perforations are formed in the block. We prefer in all cases to form the perforations in a solid block of porous material; but a block may be built up of sections or plates of earthenware or other porous material fitting neatly and clamped together.

Our device so far as described above is in its crudest form, and in perfecting and adapting our invention to practical use we have superadded many important features to it, the most important of which is the addition to the block perforated, as above described, of a second series of perforations interposed among the first series and opening upon the outer side of the porous block, but not communicating with the filter-chamber or with the first series of perforations, except through the mass of the porous material. This second series of perforations receives the filtered fluid, and as it flows out of their open ends it is collected and stored in any convenient way. It is important that the perforations should be symmetrically arranged, so that the distance through which the fluid travels through the mass from each receiving-perforation to the adjacent delivery-perforations shall be substantially the same and so that the strains on the block shall also be evenly distributed, thus economizing material and power.

Where the process of separation is carried on at high pressure, as in the separation of oils, for which our device is especially intended and organized, as shown in the drawings, the perforated block (which we will hereinafter refer to as the "filter-block") should be inclosed in the filter-chamber, so that its sides shall be exposed to the same pressure as its internal perforations, in this way counteracting the internal bursting force.

We have, in adapting our invention to use, combined with it mechanism for preparing and delivering the material to be treated to it and for carrying out the separation under the most favorable conditions. The various combinations of mechanism embodied in our apparatus and the details of construction of the filter-block and its immediate connections will be best understood after a description of the drawings, and the special features which we desire to cover by this application will be clearly pointed out in the claims, and we will here note that several of the appliances here described and shown in combination with the separating device are independently useful, and as they cannot be specifically claimed in this application will form the subject-matter of other applications for Letters Patent.

Reference being now had to the drawings which illustrate our invention as organized for the extraction of oil from cotton-seed meal or from other oil-producing seed, Figure 1 is a side elevation of a combination of devices for handling and forcing the cotton-seed meal into the filter-chambers and through the filter-blocks. Fig. 2 is a plan view of the arrangement of several filter-chambers and blocks in combination and in connection with a conduit through which the meal is fed to them. Fig. 3 is a rear elevation of the combination shown in Fig. 2. Fig. 4 is a central sectional view of the filter-chamber and filter-block combined and provided with coacting appliances in what we consider to be the best way yet devised by us. Fig. 5 is a sectional view of the passage and cock leading into the filter-chamber, taken on the line $x\ x$ of Fig. 4. Fig. 6 is a central cross-section of half of the filter-block shown in Fig. 4. Fig. 7 is a face view of the plate applied to the end of the filter-block, as shown in Fig. 4. Fig. 8 is a plan view of the peculiar valve shown in Fig. 4 and which, in that figure, is shown as on the section-line $y\ y$ of Fig. 8. Fig. 9 is a front view of the peculiar pump shown at F in Fig. 1, the pump-cylinder being shown in section. Fig. 10 is a cross-section of the grinder K of Fig. 1; Fig. 11, a longitudinal section of the same on the line $z\ z$ of Fig. 10. Fig. 12 is a view of a filter-chamber and filter-block provided with a modified form of valve to regulate the passage of material through the perforations. Fig. 13 shows a filter-block built up of a number of plates or sections clamped together. Fig. 14 shows a modified and very simple arrangement of filter-chamber and filter-block, and Figs. 15 and 16, illustrate another modification of our device.

A is a device for heating or "cooking" the cotton-seed meal which is fed into its top through a hopper $A^4$ or pipe, such as is indicated in dotted lines at $A^5$. The cooker A is divided into three chambers $A'$, $A^2$, and $A^3$ by partitions $a'$ and $a^2$, and the chambers $A'$ and $A^2$ are united by pipes $a\ a\ a$, &c., as shown.

$A^6$ and $A^7$ are steam-pipes by which steam is introduced and withdrawn from chamber $A^3$.

Leading from the bottom of the hopper-shaped chamber $A^2$ is a pipe B which branches at its other end, as shown at $b\ b$, to connect with the upper and lower ends of a pump-cylinder C, in which $C'$ is the piston; $C^2$, the piston-rod; $C^3$, the connecting-rod; $C^4\ C^4$, guides for the connecting-rod head, and $c\ c\ c'\ c'$ valves. The connecting-rod $C^3$ is actuated by a crank $D'$ on a shaft D, which is driven by a miter-wheel $D^2$ meshing with wheel $K^2$. Branch pipes $b'\ b'$ lead from pump C to a pipe $B'$ which opens into a hydraulic accumulator E from which a pipe $B^2$ leads, and branching, as shown at $b^2\ b^2$, connects with the force-pump F. This force-pump is of peculiar construction. As shown in Figs. 1 and 9 it consists of a casting $F'$, in which are formed cylinders $f\ f'$ and a chamber G between said cylinders, the cylinders $f\ f'$ opening into chamber G at one end and being open at their other ends, as shown.

H and $H'$ are valves closing the ends of cylinders $f\ f'$ which open into chamber G, $H^2$ being a spring arranged to keep said valves seated. The branch pipes $b^2\ b^2$ connect with cylinders $f\ f'$ near their outer ends, as is shown at $g$ and $g'$.

In guides formed on casting F is secured a frame I, $i\ i$ being guides attached to said frame to engage the guides (not shown) on casting F, and to each end of the frame are secured plunger-pistons $I'\ I^2$, which, as shown, are fitted in the open ends of cylinders $f\ f'$.

$i'\ i'$ are trunnions formed on frame I, to which is attached a connecting-frame J, which frame is at its other end connected with a crank $K'$ on shaft K, said shaft being driven by a pulley $K^3$ and having a miter-wheel $K^2$ to drive wheel $D^2$ and its connected shaft.

From the chamber G a pipe $B^3$ leads to a peculiar grinding device K, which (see Figs. 10 and 11) is made up of an iron body $K'$ having a central cavity $K^2$ formed to receive the plates hereinafter described. The body $K'$ is provided with conical ends so as to form chambers $K^3\ K^3$.

$K^4\ K^4$, &c., are plates, preferably of iron, formed with scalloped faces, as shown, and adapted to be secured together, as shown in Figs. 10 and 11, so as to form a number of tortuous passages $K^5\ K^5$, &c.

$K^6$ indicates a series of bolts arranged to clamp the plates $K^4$ and the parts of the body $K'$ together.

From the grinder K a pipe L leads to the filter-chambers M. The construction of this conduit is shown in Figs. 2 and 3, where a number of filter-chambers (four) are shown as connected with it. In such a case the pipe should be of rectangular cross-section, and it should diminish in width proportionately to the size of the branch pipes $l\ l'\ l^2\ l^3$, leading from it. We also prefer to provide the branch pipes with cutting-edges, so that the meal to enter them will be, as it were, sliced off from the contents of the conduit L. $l^4$ and $l^5$ represent such cutting-edges, as does also $l^6$, and the area of the part $L'$ of pipe L is equal to that of L, less the area of the pipes $l\ l^2$.

$M'$, Fig. 4, indicates the neck or entrance of the filter-chamber M, $M^2$ being a cock to control the entrance of the meal, and $M^3$ the cavity of the chamber in which is inserted the filter-block N. The filter-block, as shown, is constructed as we propose to make it of bisque.

$n\ n$, &c., are a series of perforations passing entirely through the block and preferably tapered toward the rear end of the block, as shown, so that the meal will have a gradually-expanding passage to pass through.

$n'\ n'$, &c., are perforations interposed among the series marked $n$ and opening at the rear of the block but not into the filter-chamber or into the perforations $n\ n$, &c.

It is important in practice that the perforations should be arranged in a symmetrical figure and at equal distances apart, and this is, we believe, best attained by arranging them in concentric hexagons, as shown.

As shown, the filter-block is formed to fit neatly in an annular projection $m'$ of the filter-chamber M, and a lead spherical packing P is inserted in the rear of the projecting rib $m'$ to make a tight joint between the block and the end of the chamber. All but the extreme rear of block N is situated within the opening $M^3$ of chamber M and its sides are thus exposed to the same strains as are communicated to it through its perforations $n$, an important matter where very high pressures are used.

O is a plate preferably of metal which is held in place in the rear of the filter-block and in close contact with it. This plate is perforated with a series of holes $o$ $o$, &c., corresponding in arrangement with the series of perforations $n$ $n$, &c., in block N and is so arranged in the end of the chamber M that its holes will register with and form a continuation of the perforations $n$. This plate O is also formed with channels $o'$ $o'$, &c., in its face so arranged as to lie over the openings of the perforations $n'$ $n'$, &c., in block N, and one or more channels $O'$ are formed in it to intersect the channels $o'$ and form an exit-passage, a channel, such as $O^2$, (indicated in dotted lines in Fig. 4,) being formed to communicate with and form a continuation of said channel $O'$. The plate O is held in position by the ring Q, which is bolted to a flange $m$ of the chamber M, as shown.

It is of course important that the plate O should fit closely against the end of the block N so that the meal in perforations $n$ shall not escape at the joints, and to insure the tightness of the fit it may be advisable to make the face of plate O with ridges to fit against the block N, instead of relying merely upon the pressure to clamp the two flat surfaces together.

R is the valve by which the holes $o$ $o$, &c., are partially closed, or, rather, their openings regulated so as to offer the desired amount of resistance to the passage of the meal through the perforations $n$ $n$, &c. It is made, as is shown, in the form of a gridiron with radial braces $R'$ and connecting-webs $R^2$ $R^2$, &c., said webs being arranged to fit over the rows of holes $o$ $o$, &c., in plate O. The valve R is adjustable by means of a screw T operated by a hand-wheel $T'$ and screwing in a cross-arm S of the ring Q, said arm being hinged on a lug of the ring at $s$ and its other end held in an opposite lug by a pin or spring-latch at $s'$.

In Fig. 1, $u$ $u$, &c., represent pipes communicating with passages $O^2$ and with a main U, $U'$ being a pump situated in said main.

Instead of the gridiron-valve R, any convenient device for regulating the flow through the perforations of the filter-block may be substituted. Thus in Fig. 12, a conical end piece, $M^4$, is bolted on the end of the chamber M and a single needle-valve, $R^4$, used to regulate the flow through its opening $M^5$.

It will also be obvious that any good mechanical means may be substituted for the devices shown for holding the filter-block in position, and of course the plate O, while a convenient device, is not indispensable.

In Fig. 14 we have shown a very simple modification of our device, a block $N^2$ with a single perforation or row of perforations being secured in the end of chamber M and projecting out from it, as shown, $R^5$ being a valve to close or regulate the opening of the perforation on the outside. In this case the filtrate will pass through the walls of the block $N^2$ and be collected in any convenient way.

In Fig. 13 we have illustrated in section the construction of a filter-block built up of a number of sections or parts bolted tightly together.

The operation of the device, as fully illustrated in the drawings, is as follows: The cotton-seed having been ground, the meal is introduced into the cooker A and steam turned into the chamber $A^3$, the pump C, which is both a suction and force pump, draws the meal from the chambers $A'$ through the pipes $a$ $a$, &c., into the chamber $A^2$, and thence through pipe B and its branches $b$ $b$ into the pump-cylinder, the meal, of course, being heated in the cooker A. From the pump C the meal is forced through pipe $B'$ and through the accumulator E and pipe $B^2$ with its branches $b^2$ $b^2$ to the pump F, the accumulator serving the purpose of keeping up a constant pressure in pipe $B^2$. The operation of the pump F is as follows: As the frame J, for instance, moves up, the plunger I moves up in cylinder $f$, and the valve H being closed creates a vacuum in it until it uncovers the opening $g$, when the meal impelled by pressure and the suction of the vacuum in $f$, being loosened by the expansion of the air inclosed in its particles, rushes in and fills the cylinder. The plunger then moves down, closing the opening $g$ and forcing the meal through valve H into the passage G. The action of the plunger $I^2$ in cylinder $f'$ is of course similar and reciprocal, and a substantially constant flow of meal into the chamber G is maintained by their joint action. From chambers G the meal is forced into pipe $B^3$, and thence through the grinder K, and being under great pressure, the oil-cells are very thoroughly abraded and ruptured by the differential motion of the tortuous flow. From the grinder K the meal passes into the conduit L, which is preferably rectangular, as described, for convenience in arranging the cutting-edges in it and preserving the desired ratio of its area to the area of by-pipes leading from it. From the conduit L the meal is led off through the conduits $l$, $l'$, $l^2$ and $l^3$ to the filter-chambers M, any one of which can, if desired, be closed by its valve $M^2$. Entering the filter-chamber the meal fills its cavity and passes into the openings $n$ $n$, &c., of the filter-block and through them into the holes $o$ $o$, &c., in plate O, from which it is dropped into a hopper (not shown) and conveyed away in any convenient way. The passage of the meal from the holes o o, &c., is checked by the valve, placed as described, so as to partially close these openings, and any desired pressure is thus maintained in the filter-chamber. Besides this, the meal is finally broken up and delivered in good condition for subsequent handling.

The great pressure to which the meal is exposed in the perforations n n, &c., causes the oil to be expressed from it and to pass through the porous walls of the perforations into the perforations n' n', &c., whence it runs into the channels o' o', &c., of plate O, and thence through channels O' and O² into pipes u, the pump U' being used to make a suction on the pipes and through them in the perforations n' to facilitate the passage of the oil through the walls of porous material.

The pump U' is not by any means essential and the system appliances through which the meal is passed on its way to the filter-chambers may be greatly modified, all that is necessary being some device or devices for forcing the meal with high pressure into the filter-chamber, and the combination shown being designed by us simply as in our belief the best for maintaining the desired pressure and delivering the meal in the best condition for the separation of its oil.

For many uses to which our invention is applicable it will not be necessary to have it work under high pressure, though its rapidity of action will always depend largely on the pressure employed.

In all cases it is preferable to have the perforations into which the material to be filtered passes open at both ends, for, even in case of water, it is highly important that the perforations should be accessible for cleaning, and of course the openings can be closed or nearly closed in use by a valve or valves such as are described above.

The chamber M, in which the filter-block is secured, need not necessarily be an enlarged chamber, as shown, for the perforated block could for some uses be secured in a conduit or pipe which, in case of such use, would correspond to and be the equivalent of the enlarged chamber, and it will be understood that in referring to a "filter-chamber" in the claims we use the words in this broad sense.

In Figs. 15 and 16 we have illustrated a modification of our device, in which the perforations n', instead of running through the block, are intersected by transverse perforations n², which lead to a common conduit n³, from which the filtrate is withdrawn in any convenient way. By this device we are enabled to dispense with cap O. In the figures, Fig. 15 is a section on line w w of Fig. 16 and Fig. 16 a section on line v v of Fig. 15.

Having now described our invention, what we claim as new, and desire to secure by Letters Patent, is—

1. As a filtering device, a block of porous material having a series of perforations formed in its mass for the reception of the material to be filtered; and a second series of perforations interposed among the first series but not communicating with them for the reception and delivery of the filtrate.

2. In combination with a filter-chamber, a block of porous material having a perforation or perforations formed in its mass and opening into said chamber for the reception of the material to be filtered; said perforation or perforations extending through the mass and opening outside of the chamber, in combination with a valve arranged to check the flow of material through said perforations.

3. In combination with a filter-chamber, a block of porous material having perforations formed in its mass and opening into said chamber for the reception of the material to be filtered; said perforations extending through the mass and opening outside of said chamber and having also perforations interposed among the first series of perforations and opening on the outside of the filter-chamber but not communicating with said chamber or with the first series of perforations; and a valve arranged on the outside of the filter-block so as to check and regulate the flow of the material through the first series of perforations.

4. In combination with a filter-chamber, a solid block of porous material having a series of perforations formed in its mass opening at one end into the filter-chamber and at the other end on the outside of the same; said perforations being tapered in form so as to enlarge slightly and gradually from their opening into the filter-chamber to their opening outside of the same; and having a second series of perforations formed in its mass interposed among the first series of perforations and opening on the outside of the chamber but not communicating with the said chamber or with the first series of perforations; and a valve arranged on the outside of said block so as to check and regulate the flow of material through the first series of perforations.

5. In combination with a filter-chamber, a solid block of porous material having a series of perforations formed in its mass opening at one end into the filter-chamber and at the other end on the outside of the same; and having a second series of perforations formed in its mass interposed among the first series of perforations and opening on the outside of the chamber but not communicating with the said chamber or with the first series of perforations, each perforation of the two series being substantially equidistant from the adjoining perforations; and a valve arranged on the outside of the said block so as to check and regulate the flow of material through the first series of perforations.

6. In combination with a filter-chamber, a solid block of porous material having a series of perforations formed in its mass and so distributed as to form concentric hexagons; said perforations opening at one end into the filter-chamber and at the other end on the outside of the same; and having a second series of perforations formed in its mass and so disposed as to form concentric hexagons each interposed between the hexagonal figures formed by the first series of perforations; said second series of perforations opening on the outside of the chamber but not communicating with it or with the first series of perforations, and each perforation of the two series being substantially equidistant from the adjoining perforation; and a valve arranged on the outside of said block so as to check and regulate the flow of material through the first series of perforations.

7. In combination with a filter-chamber, a block of porous material having a series of perforations formed in it, opening at one end in the filter-chamber and at the other on the outside of the same; and a second series of perforations interposed among the first series and opening on the outside of the filter-chamber, but not communicating with it or with the first series of perforations, said filter-block being substantially inclosed and surrounded by the filter-chamber, and having in combination with it a valve to regulate the openings of the first series of perforations on the outside of the chamber.

8. In a filter substantially as specified, the combination of the filter-block N having perforations $n$ and $n'$ with a plate O having holes $o$ adapted to register with the perforations $n$; channels $o'$ adapted to lie over the openings of the perforations $n'$ and one or more channels $O'$ to connect the channels $o'$ and receive the filtrate from them.

9. In a filter substantially as specified, the combination of the filter-chamber M, the filter-block N secured within the same, the plate O having holes and channels as described to register with the perforations in block N and a gridiron-valve R arranged to regulate the flow of material through the holes in plate O.

10. In a filtering apparatus substantially as specified, the combination of a series of filtering-chambers M with a conduit L L' and branches $l\ l'\ l^2\ l^3$, said conduit diminishing in area in proportion to the area of the branch pipes leading from it and having sharp cutting edges within it to divide the mass passing through it where a branch pipe leads therefrom; and mechanism for forcing the material to be filtered through the said conduit and into the filter-chambers at high pressure.

11. In a filter apparatus substantially as specified the combination of one or more filter-chambers M having perforated filter-blocks N secured therein; of a conduit through which the material to be filtered is delivered to the filter-chambers; a grinder K situated in said conduit and having tortuous passages $K^5$ formed in it as described; and mechanism for forcing the material to be filtered through said grinder and into the chambers at high pressure.

12. In a filter apparatus substantially as specified, the combination of one or more filter-chambers M having perforated filter-blocks N secured in them with a conduit leading to the filter-chamber; a pump for forcing meal into the conduit; an accumulator on the delivery side of the pump situated in the conduit and a force-pump on the delivery side of the accumulator arranged to act so as to force the meal into the filter-chambers.

13. In a filter apparatus substantially as specified, the combination of one or more filter-chambers M having perforated filter-blocks N secured in them with a conduit leading to the filter-chamber; a force-pump F constructed as described, and mechanism for delivering meal to said pump under pressure.

ARTHUR H. LEA.
JOHN FRANCIS FOULKE.

Witnesses:
LEWIS R. DICK,
JOSHUA MATLACK, Jr.